US008231376B2

(12) United States Patent
Iwakiri et al.

(10) Patent No.: US 8,231,376 B2

(45) Date of Patent: Jul. 31, 2012

(54) METAL MOLD FOR COMPRESSION FORMING

(75) Inventors: Yuuji Iwakiri, Kanagawa (JP); Taketoshi Manou, Kanagawa (JP); Tsuneo Imatani, Kanagawa (JP); Hideto Monzen, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 166 days.

(21) Appl. No.: 12/520,370

(22) PCT Filed: Feb. 26, 2008

(86) PCT No.: PCT/JP2008/053261

§ 371 (c)(1), (2), (4) Date: Jun. 19, 2009

(87) PCT Pub. No.: WO2008/114579

PCT Pub. Date: Sep. 28, 2008

(65) Prior Publication Data

US 2010/0062092 A1 Mar. 11, 2010

(30) Foreign Application Priority Data

Mar. 22, 2007 (JP) ................................ 2007-074477

(51) Int. Cl.
*B29C 43/50* (2006.01)
*B29C 49/02* (2006.01)

(52) U.S. Cl. .................... 425/348 R; 425/350; 425/412; 425/422; 425/528

(58) Field of Classification Search ................. 425/441, 425/442, 552, 556, 547, 809, DIG. 58, 348 R, 425/350, 412, 422, 528, 438
See application file for complete search history.

(56) References Cited

U.S. PATENT DOCUMENTS 3,511,845 A * 5/1970 Scalora ......................... 264/294
4,529,372 A 7/1985 Saumsiegle
(Continued)

FOREIGN PATENT DOCUMENTS

EP 1628817 3/2006
(Continued)

OTHER PUBLICATIONS

Database WPI Week 200325, Thomson Scientific, London, GB; AN, 2003-251158, XP002571174.

(Continued)

*Primary Examiner* — Richard Crispino
*Assistant Examiner* — Thukhanh Nguyen
(74) *Attorney, Agent, or Firm* — Greenblum & Bernstein, P.L.C.

(57) ABSTRACT

To provide a metal mold for forming a preform decreasing the hitting of metal molds at a portion where a slide insert metal mold and a cavity metal mold undergo the sliding yet maintaining the pressure. The metal mold (33) for forming the preform includes a slide insert metal mold (36) split into at least two for forming at least a nozzle portion of the preform, wherein a pressure is maintained by using a fitting portion which includes a preform-forming portion of the slide insert metal mold (36) coupled together from the split state and a cavity metal mold (34). Auxiliary fitting portions (40*a,* 40*b*) where the slide insert metal mold (36) and the cavity metal mold (34) undergo the sliding is formed at a position of not forming the preform separate from the fitting portion that includes the preform-forming portion.

3 Claims, 7 Drawing Sheets

U.S. PATENT DOCUMENTS

| | | | | |
|---|---|---|---|---|
| 6,276,920 | B1 * | 8/2001 | Doke et al. | 425/412 |
| 6,716,386 | B2 * | 4/2004 | Saito et al. | 264/532 |
| 7,766,643 | B2 * | 8/2010 | Zuffa | 425/441 |
| 2002/0088767 | A1 | 7/2002 | Saito et al. | |
| 2006/0071368 | A1 | 4/2006 | Mani | |
| 2006/0231978 | A1 | 10/2006 | Beltrandi et al. | |

FOREIGN PATENT DOCUMENTS

| | | |
|---|---|---|
| JP | 52-035975 | 8/1977 |
| JP | 2000-025729 | 1/2000 |
| JP | 2002-301758 | 10/2002 |
| JP | 2003-159739 | 6/2003 |
| WO | 2004/103674 | 12/2004 |
| WO | 2005/058572 | 6/2005 |

OTHER PUBLICATIONS

Supplementary European Search Report dated Mar. 3, 2010 that issued with respect to patent family member European Patent Application No. 08720849.

* cited by examiner

METAL MOLD FOR COMPRESSION FORMING

TECHNICAL FIELD

The present invention relates to a metal mold for compression-forming a preform maintaining a pressure by using a fitting portion that includes a preform-forming portion which comprises a slide insert metal mold coupled together from the split state and a cavity metal mold.

BACKGROUND ART

FIG. 7 illustrates a conventional metal mold 51 for compression-forming a preform.

The metal mold 51 for compression forming includes a cavity metal mold 52 which is a female mold, a core metal mold 53 which is a male mold and a slide insert metal mold 54 which is a split mold.

The cavity metal mold 52 has a cavity 56 formed therein and an upwardly facing small protuberance 57 formed surrounding the upper portion of the cavity 56. Further, a ring-like guide ring 58 is provided surrounding the cavity metal mold 52 in concentric with the cavity metal mold so as to slide. An inner circular truncated conical surface 59 having a diameter increasing upward is formed in the upper inner circumferential surface of the guide ring 58.

On the other hand, the core metal mold 53 has the core metal mold 53 that is fixed to a support member 61 that can be moved up and down. The core metal mold 53 is surrounded by the slide insert metal mold 54 which can be opened and closed in the right-and-left direction. The slide insert metal mold 54 is mounted on the support member 61 so as to be opened and closed in the right-and-left direction. A fitting portion (pressure-maintaining portion) 62 is formed in the lower inner circumferential surface of the slide insert metal mold 54 to thereby form an outer circumferential surface of nozzle portion of the preform while an outer circular truncated conical surface 60 having a diameter decreasing downward is formed in the lower outer circumferential surface thereof.

Described below is the forming operation by using the above metal mold 51 for compression-forming the preform.

At the initial position of the metal mold 51 for compression forming shown in FIG. 7A, the cavity metal mold 52 and the core metal mold 53 are arranged being spaced apart in the up-and-down direction, and a molten resin 64 is contained in the cavity 56.

In the mold-clamping step shown in FIG. 7B, the core metal mold 53 moves down into the cavity 56, and the molten resin 64 nearly fills a space defined by the cavity metal mold 52 and the core metal mold 53. At the same time, the slide insert metal mold 54, too, moves down to come in contact with the guide ring 58. Accordingly, the molten resin 64 in the cavity flows into the space defined by the core metal mold 53 and the slide insert metal mold 54. At this moment, the fitting portion 62 of the slide insert metal mold 54 starts sliding relative to the small protuberance 57 of the cavity metal mold 52 as indicated by an arrow X.

At the end of the mold clamping shown in FIG. 7C, the core metal mold 53 moves down to the lowermost end position. The space defined by the cavity metal mold 52, core metal mold 53 and slide insert metal mold 54 assumes the same shape as the preform that is to be formed and is filled with the molten resin.

At this moment as indicated by an arrow Y, sliding of the fitting portion 62 of the slide insert metal mold 54 relative to the small protuberance 57 of the cavity metal mold 52 ends.

As described above, the fitting portion 62 slides against the small protuberance 57 so as to be in mesh absorbing the contraction of volume and making it possible to obtain a preform for blow forming without strain.

[Patent document 1] JP-A-2003-159739

DISCLOSURE OF THE INVENTION

Problems to be Solved by the Invention

The core metal mold 53 and the cavity metal mold 52 of the metal mold 51 for compression-forming a preform have heretofore been centered relative to each other by bringing the guide ring 58 into contact with the slide insert metal mold 54 as taught in the patent document 1. According to this method, however, the positioning precision could not be easily attained since the slide insert metal mold 54 and the guide ring 58 were fitted to each other via the inner and outer circular truncated conical surfaces 59 and 60.

Under a neck ring, further, there is a portion where the slide insert metal mold 54 and the cavity metal mold 52 fit and slide each other. If the positioning precision (centering) of the fitting portion is poor, the small protuberance 57 of the cavity metal mold 52 hits the fitting portion (pressure-maintaining portion) 62 of the slide insert metal mold 54 to damage the metal mold. If a large clearance is maintained between the small protuberance 57 and the fitting portion 62 for sliding, then the position is deviated due to the play of the metal molds, resin leaks through the clearance and burr occurs to the product.

Further, the positioning precision (centering) of the core metal mold 53 and the cavity metal mold 52 affects the thickness of the body portion of the preform, and it is desired to provide a metal mold structure which features a higher positioning precision.

The present invention was accomplished in view of the above-mentioned circumstances, and has an object of providing a metal mold for compression-forming a preform capable of uniforming the thickness of the body portion of the preform by preventing the hitting of metal molds at portions where the slide insert metal mold and the cavity metal mold fit and slide.

Means for Solving the Problem

In order to achieve the above object, the metal mold for compression-forming a formed body of the present invention comprises a cavity metal mold for forming the outer surface of the formed body, and a core metal mold for forming the inner surface of the formed body, wherein a pressure is maintained by using a fitting portion which includes a formed body-forming portion of the cavity metal mold and the core metal mold, and an auxiliary fitting portion where the cavity metal mold and the core metal mold undergo the sliding is formed at a position of not forming the formed body separate from the fitting portion that includes the formed body-forming portion.

Further, the metal mold for compression forming of the invention comprises a cavity metal mold for forming the outer surface of a blow-formed portion of a preform which is a formed body, a core metal mold for forming at least the inner surface of the preform, and a slide insert metal mold split into at least two and for forming the outer surface of at least a nozzle portion of the preform, wherein a pressure is maintained by using a fitting portion which includes a preform-forming portion of the slide insert metal mold coupled together from the split state and the cavity metal mold, and an auxiliary fitting portion where the slide insert metal mold and the cavity metal mold undergo the sliding is formed at a position of not forming the preform separate from the fitting portion that includes the preform-forming portion.

In the metal mold for compression forming, it is desired that at the time of compression forming, the auxiliary fitting portion fits and slides earlier than the fitting portion which includes the formed body-forming portion.

In the metal mold for compression forming, it is desired that the fitting clearance of the auxiliary fitting portion is smaller than that of the fitting portion which includes the formed body-forming portion.

The metal mold for compression forming further includes a slidable guide ring for guiding and clamping the split surfaces on the outer circumferential surface of the cavity metal mold, wherein an inner circular truncated conical surface is formed in the inner circumferential surface of the guide ring, an outer circular truncated conical surface is formed in the outer circumferential surface of the slide insert metal mold, the guide ring clamps and fixes the split surfaces as the inner and outer circular truncated conical surfaces come in contact with each other, and the inner and outer circular truncated conical surfaces come in contact with each other earlier than the auxiliary fitting portion that comes into fit.

Effect of the Invention

In the metal mold for compression forming of the present invention, a pressure is maintained by using the fitting portion which includes the preform-forming portion of the slide insert metal mold coupled together from the split state and the cavity metal mold, and the auxiliary fitting portion where the slide insert metal mold and the cavity metal mold undergo the sliding is formed at the position of not forming the preform separate from the fitting portion that includes the preform-forming portion. Upon providing the slidable fitting portion at a portion that does not include the preform-forming portion, it is allowed to decrease the load at the fitting portion that includes the preform-forming portion, and the positioning can be realized to fit the metal molds together maintaining high precision while preventing damage to the metal mold.

In the metal mold for compression forming, the auxiliary fitting portion fits and slides earlier than the fitting portion which includes the formed body-forming portion at the time of compression forming. With the slidable fitting portion being positioned first at the fitting portion, the shock decreases at a moment when the fitting portion that includes the preform-forming portion fits, and the fitting is smoothly accomplished.

In the metal mold for compression forming, further, the fitting clearance of the auxiliary fitting portion is smaller than that of the fitting portion which includes the formed body-forming portion. Therefore, the clearance of the slidable auxiliary fitting portion can be set to be narrower than that of the fitting portion that includes the preform-forming portion making it possible to further decrease the contact-sliding load of the fitting portion that includes the preform-forming portion. Further, upon effecting the positioning relying chiefly upon the slidable auxiliary fitting portion, there is no probability of deviation of the metal molds, and the fitting portion that includes the preform-forming portion can be widened within a range in which the resin does not leak.

Further, the metal mold for compression forming includes a slidable guide ring for guiding and clamping the split surfaces on the outer circumferential surface of the cavity metal mold, wherein an inner circular truncated conical surface is formed in the inner circumferential surface of the guide ring, an outer circular truncated conical surface is formed in the outer circumferential surface of the slide insert metal mold, the guide ring clamps and fixes the split surfaces as the inner and outer circular truncated conical surfaces come in contact with each other, and the inner and outer circular truncated conical surfaces come in contact with each other earlier than the auxiliary fitting portion that comes into fit. Upon providing the guide ring, therefore, the split slide insert surfaces can be clamped and serve as insertion guide portion leading the fitting portion.

DESCRIPTION OF REFERENCE NUMERALS

Figure 1:
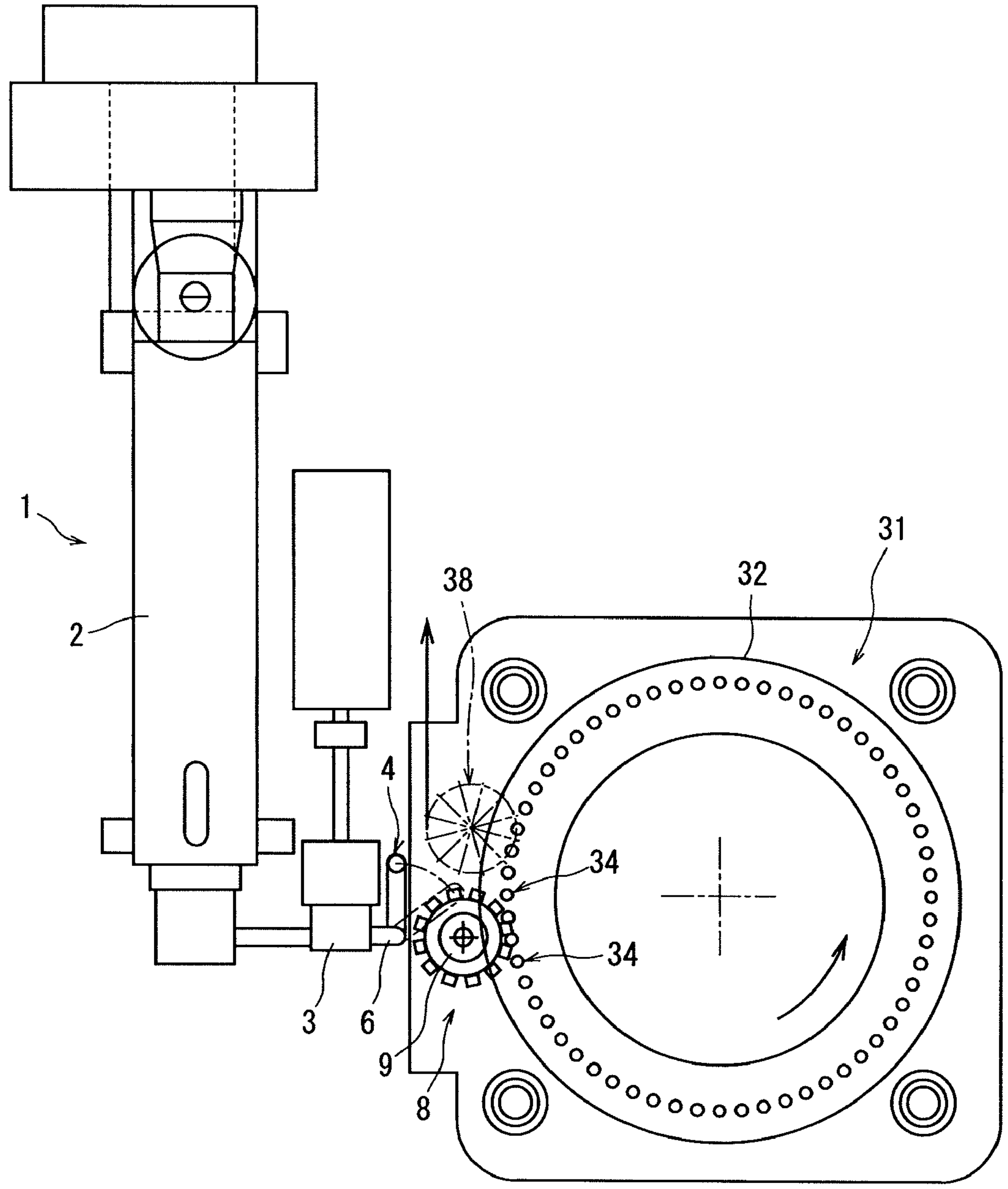
FIG. 1 is a schematic plan view of a compression forming apparatus that employs a preform-forming metal mold according to an embodiment of the invention and a synthetic resin-feeding apparatus in the preceding step.

31 apparatus for compression forming
33 metal mold for compression forming
34 cavity metal mold
34*b* small protuberance
34*c* protruded portion
35 core metal mold
36 slide insert metal mold
36*c* inner convex portion
36*d* outer convex portion
37 guide ring
38 cavity
39 fitting portion
39*a*, 39*b* slide surfaces
40 auxiliary fitting portion
40*a*, 40*b* auxiliary slide surfaces
41 initially fitting portion
43 molten resin

BEST MODE FOR CARRYING OUT THE INVENTION

An embodiment of the metal mold for compression forming of the present invention will now be described with reference to the drawings.

FIG. 1 illustrates an apparatus for compression forming and a synthetic resin-feeding apparatus for feeding a resin to the metal mold for compression-forming a preform in the apparatus for compression forming.

The synthetic resin-feeding apparatus 1 includes a cylindrical molten resin extruder 2 and a cutter wheel 8. The extruder 2 heats, melts and kneads a synthetic resin material such as polyethylene terephthalate, and conveys the molten resin to a gear pump 3. To stabilize the feed of the molten resin, the gears are in mesh in the gear pump 3, and the molten resin is discharged. The gear pump 3 is connected to a downwardly directed extrusion nozzle 4 via a conduit 6, the extrusion nozzle 4 having an extrusion opening formed at the lower end portion thereof. The synthetic resin in the molten state is formed in nearly a cylindrical shape from the extrusion opening thereof, continuously extruded downward, and is fed to the cutter wheel 8.

The cutter wheel 8 has a grip member 9*a* (see FIG. 4A) provided on a rotary turret 9 for gripping the molten resin that is cut by the cutter. Further, the apparatus 31 for compression forming includes a rotary support member 32 and a plurality of cavity metal molds 34 arranged on the rotary support member 32. In the case of FIG. 1, the rotary support member 32 is rotated in the counterclockwise direction which is opposite to that of the turret 9. The cavity metal molds 34 are arranged in a plural number in the circumferential direction of the rotary support member 32 maintaining an equal distance.

The cutter wheel 8 so works that the locus of rotation of the molten resin grip member and the locus of rotation of the cavity metal mold 34 come in contact in the same direction and that the peripheral velocities thereof are in agreement. At the position or section of these loci of rotation, the molten resin grip member is rotated in synchronism so as to be positioned just over the cavity metal mold 34 of the preform-forming metal mold 33 in the apparatus 31 for compression forming. The molten resin is thus put into the cavity metal mold 34.

Next, the metal mold for compression-forming the preform will be described in detail.

Figure 2:
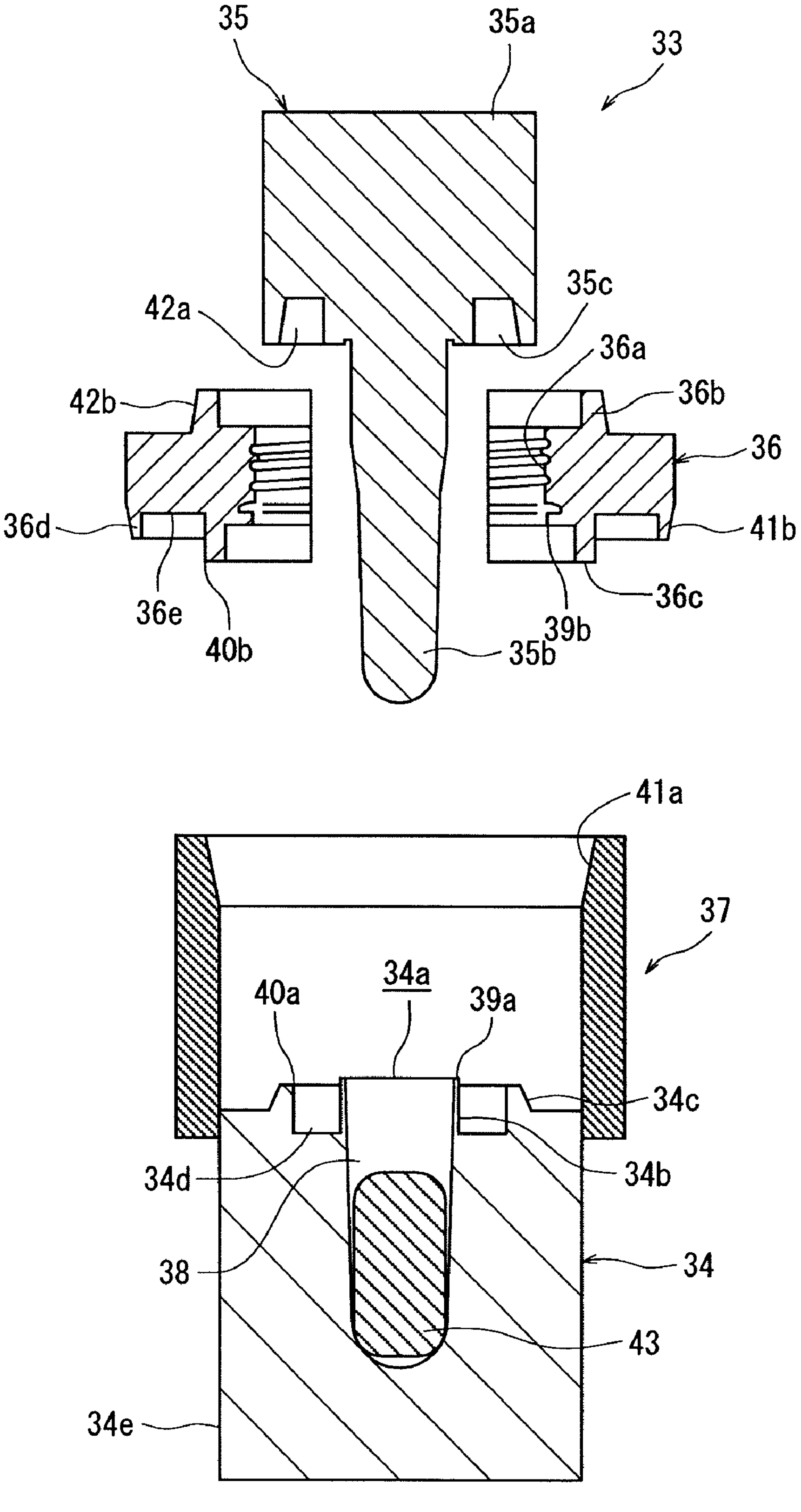
FIG. 2 is a sectional view of a metal mold for compression-forming a preform at the initial position in the compression forming apparatus shown in FIG. 1.
Figure 3:
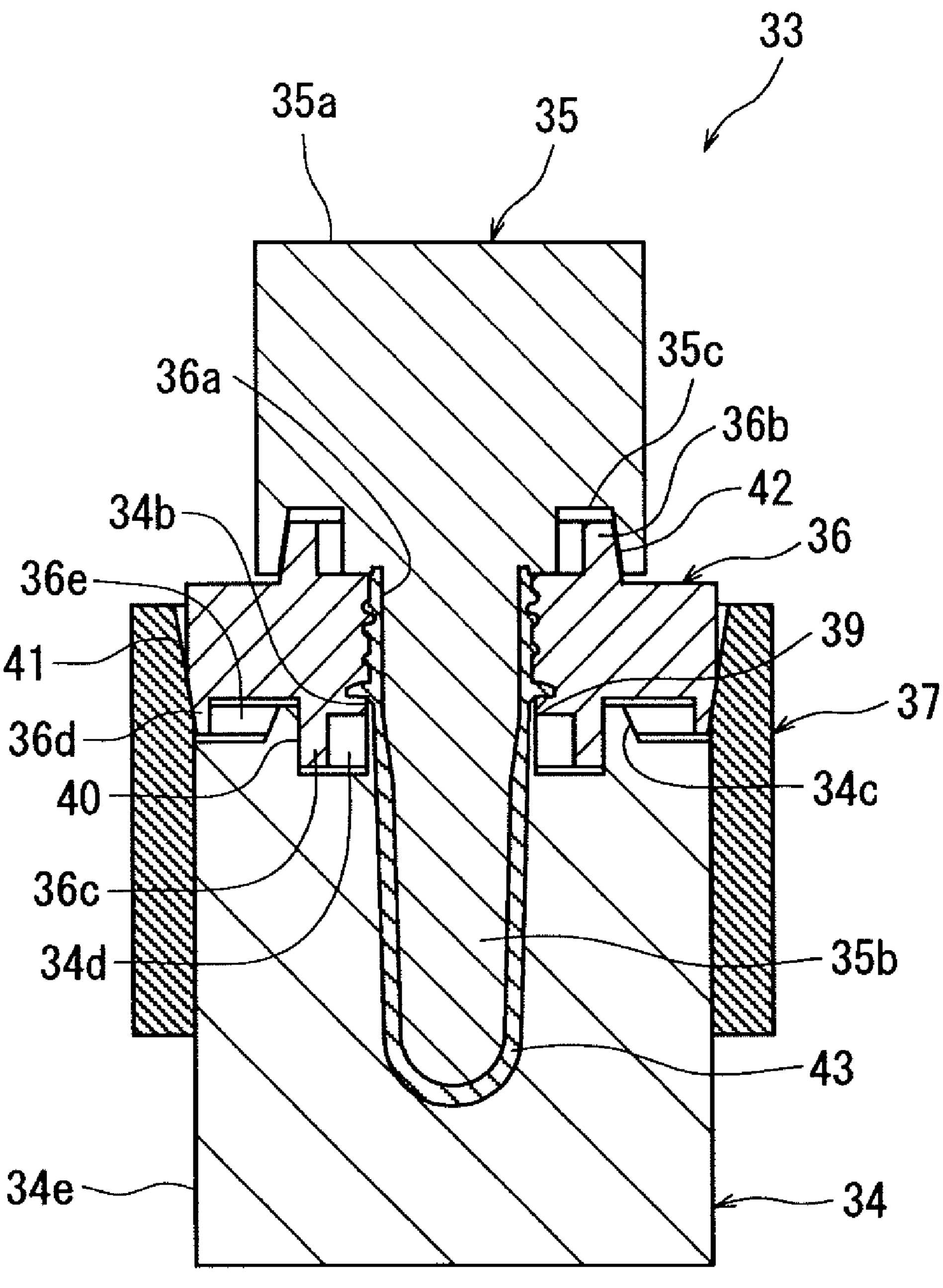
FIG. 3 is a sectional view of the metal mold for compression-forming the preform of FIG. 2 in the clamped state.

FIGS. 2 and 3 illustrate the metal mold for compression forming, wherein FIG. 2 is a sectional view in a state where the metal mold for compression forming is opened and FIG. 3 is a sectional view in a state where the metal mold for compression forming is closed.

The metal mold 33 for compression forming includes the cavity metal mold 34 which is a female mold, the core metal mold 35 which is a male mold, the slide insert metal mold 36 which is a split mold, and a guide ring 37 arranged surrounding the outer circumference of the cavity metal mold 34. The core metal mold 35 is arranged on the upper side in the up-and-down direction, the slide insert metal mold 36 is arranged at the lower part of the core metal mold 35, and the cavity metal mold 34 is arranged thereunder.

The cavity metal mold 34 is nearly of a cylindrical shape forming a cavity 38 with a circular opening 34*a* at an upper part thereof on the inside in the central portion thereof, the cavity 38 extending downward nearly vertically from the opening 34*a* thereof. The inner circumferential surface of the cavity 38 forms the outer circumferential surface of the preform.

An annular small protuberance 34*b* protruding upward is formed at the opening 34*a* of the cavity metal mold 34. An annular protruded portion 34*c* is formed on the upper surface of the cavity metal mold 34 separated away on the outer circumferential side from the small protuberance 34*b* in concentric with the small protuberance 34*b* and protrudes upward. An annular dented portion 34*d* denting downward is formed between the small protuberance 34*b* and the protruded portion 34*c*. The small protuberance 34*b* has an end portion protruding upward beyond the end of the dented portion 34*d*.

The core metal mold 35 has a support portion 35*a* at an upper part thereof and has a nearly cylindrical core body 35*b* at a lower part of the support portion 35*a*, the nearly cylindrical core body 35*b* extending downward from the center of the lower surface of the support portion 35*a*. The outer circumferential surface of the core body 35*b* forms the inner surface of the preform.

An annular concave portion 35*c* is formed in the lower surface of the support portion 35*a* in concentric with the core body 35*b* and dented upward. The outer circumferential side surface of the annular concave portion 35*c* is forming a tapered surface 42*a* expanding outward in the radial direction toward the lower side.

The slide insert metal mold 36 is split into right and left two parts assuming a semicircular shape with symmetrical surfaces, and assumes an annular shape when assembled together into one. In a state where the split metal molds are assembled together, the slide insert metal mold 36 forms a nozzle-forming hole 36*a* penetrating through the central portion thereof up and down. The nozzle-forming hole 36*a* forms the outer circumferential surface of the nozzle portion of the preform and a portion on the upper side of the nozzle body portion, which will form a nozzle-forming portion that forms an external thread and a flange. An annular protruded portion 36*b* is formed on the upper surface of the slide insert metal mold 36 and protrudes upward from a position separated away toward the outer side in the radial direction from the nozzle-forming hole 36*a*, the annular protruded portion 36*b* being formed in concentric with the core body 35*b*. The outer circumferential side surface of the annular protruded portion 36*b* is forming a tapered surface 42*b* of which the diameter decreases inward in the radial direction toward the upper side. The annular protruded portion 36*b* is so formed as to fit to the annular concave portion 35*c* of the core metal mold 35, and comes in contact thereto after the tapered surfaces 42*a* and 42*b* have slightly slid, causing the slide insert metal mold 36 to assume the annular shape from the split state of semicircular shapes.

The lower part of the slide insert metal mold 36 has an annular inner convex portion 36*c* protruding downward from a position separated away on the outer side in the radial direction from the nozzle-forming hole 36*a* and, further, has an outer convex portion 36*d* protruding downward from the outer circumferential portion of the slide insert metal mold 36. An annular concave portion 36*e* is formed between the inner convex portion 36*c* and the outer convex portion 36*d*, the annular concave portion 36*e* denting upward from the lower surface of the slide insert metal mold 36. The end of the inner convex portion 36*c* is protruding downward beyond the end of the outer convex portion 36*d*. An outer circular truncated conical surface 41*b* is formed in the outer circumferential side surface of the outer convex portion 36*d*, the outer circular truncated conical surface 41*b* having a diameter decreasing inward in the radial direction toward the lower side.

At the time of clamping the metal mold 33 for compression-forming the preform, the slide surface 39*b* formed at the lower part of the nozzle-forming hole 36*a* forms the fitting portion 39 that slides on the slide surface 39*a* of small protuberance 34*b* of the cavity metal mold 34*a*, and closes the cavity 38 from the exterior. The fitting portion 39 is arranged at a position where it comes in contact with the outer circumferential portion of the preform.

On the outer circumferential side of the fitting portion 39, an auxiliary slide surface 40*b* formed at the lower part of the outer circumferential surface of inner convex portion 36*c* of the slide insert metal mold 36, is forming an auxiliary fitting portion 40 on which will slide an auxiliary slide surface 40*a* formed at the upper part of the inner circumferential surface of protruded portion 34*c* of the cavity metal mold 34. The auxiliary fitting portion 40 is positioned separated away from the position (cavity 38) of forming the preform.

The cylindrical guide ring 37 is arranged on the outer circumferential surface 34*e* of the cavity metal mold 34, and is capable of sliding on the outer circumferential surface 34*e* in the up-and-down direction. The upper end of the guide ring 37 is forming a tapered inner circular truncated conical surface 41*a* which expands outward in the radial direction upward. At the time of clamping the metal mold 33 for forming the preform, the inner circular truncated conical surface 41*a* slightly slides on the outer circular truncated conical surface 41*b* of the slide insert metal mold 36 and, thereafter, forms an initially fitting portion 41 that comes in contact.

The fitting width of the fitting portion (contacting degree in the fitting portion) of the auxiliary fitting portion 40 is formed to be smaller than the fitting clearance of the fitting portion 39 formed by the slide surface 39*a* of the cavity metal mold 34 and the slide surface 39*b* of the slide insert metal mold 36.

At the time of clamping, the initially fitting portion 41 comes into contact first, the auxiliary fitting portion 40 comes into contact next, and the fitting portion 39 comes into contact last. The fitting portions 39, 40 and 41 are arranged in concentric.

Further, though not described, the core metal mold 35 and the slide insert metal mold 36 are provided with means for moving them up and down, and the slide insert metal mold 36 is further provided with a slide mechanism for opening to the right and left.

Next, described below is a procedure for forming the preform by using the metal mold 33 for compression-forming the preform.

Figure 4:
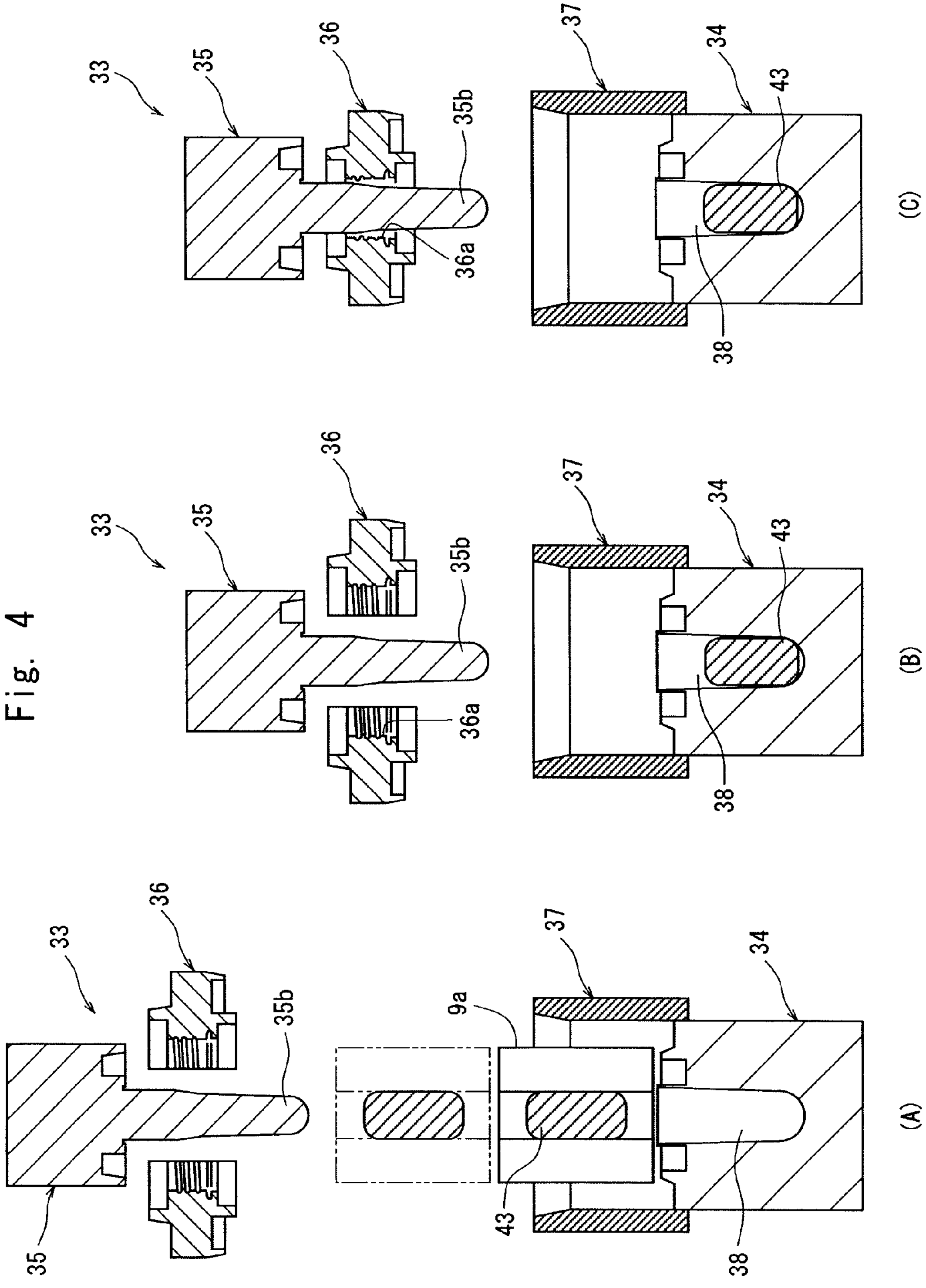
FIG. 4 is a view of steps illustrating the procedure of operation of the metal mold for compression-forming the preform, wherein A is a sectional view of the initial step in forming the preform by using the metal mold for compression forming, B is a sectional view of the second step and C is a sectional view of the third step.

FIG. 4A shows one of a plurality of metal molds 33 for compression forming in the apparatus 31 for compression forming. In the initial state, the cavity metal mold 34, slide insert metal mold 36 and core metal mold 35 are arranged being separated away from each other up and down. As shown in FIG. 1, the cavity metal mold 34 moves on a circular locus being supported by the rotary support member 32. On the other hand, the grip member 9*a* provided on the rotary turret 9 for gripping the molten resin 43 rotates on a circular locus separate from that of the cavity metal mold 34. Referring to FIG. 4A, the grip member 9*a* and the cavity metal mold 34 have a common contact point in the up-and-down direction so as to feed the molten resin 43 (drop) onto the bottom of cavity 38 of the cavity metal mold 34.

After the molten resin 43 is fed into the cavity metal mold 34, the grip member 9*a* separates away from the locus of the cavity metal mold 34, and the core metal mold 35 and the slide insert metal mold 36 descend as shown in FIG. 4B. Next, as shown in FIG. 4C, the slide insert metal mold 36 opened to the right and left advances toward the core metal core 35. The slide insert metal mold 36 is, thereafter, closed to assume an annular shape. The core body 35*b* of the core metal mold 35 penetrates through the nozzle-forming portion 36*a*. From this state as shown in FIG. 5A, the core metal mold 35 descends, and the annular concave portion 35*c* is fitted onto the annular protruded portion 36*b* of the slide insert metal mold 36.

Figure 5:
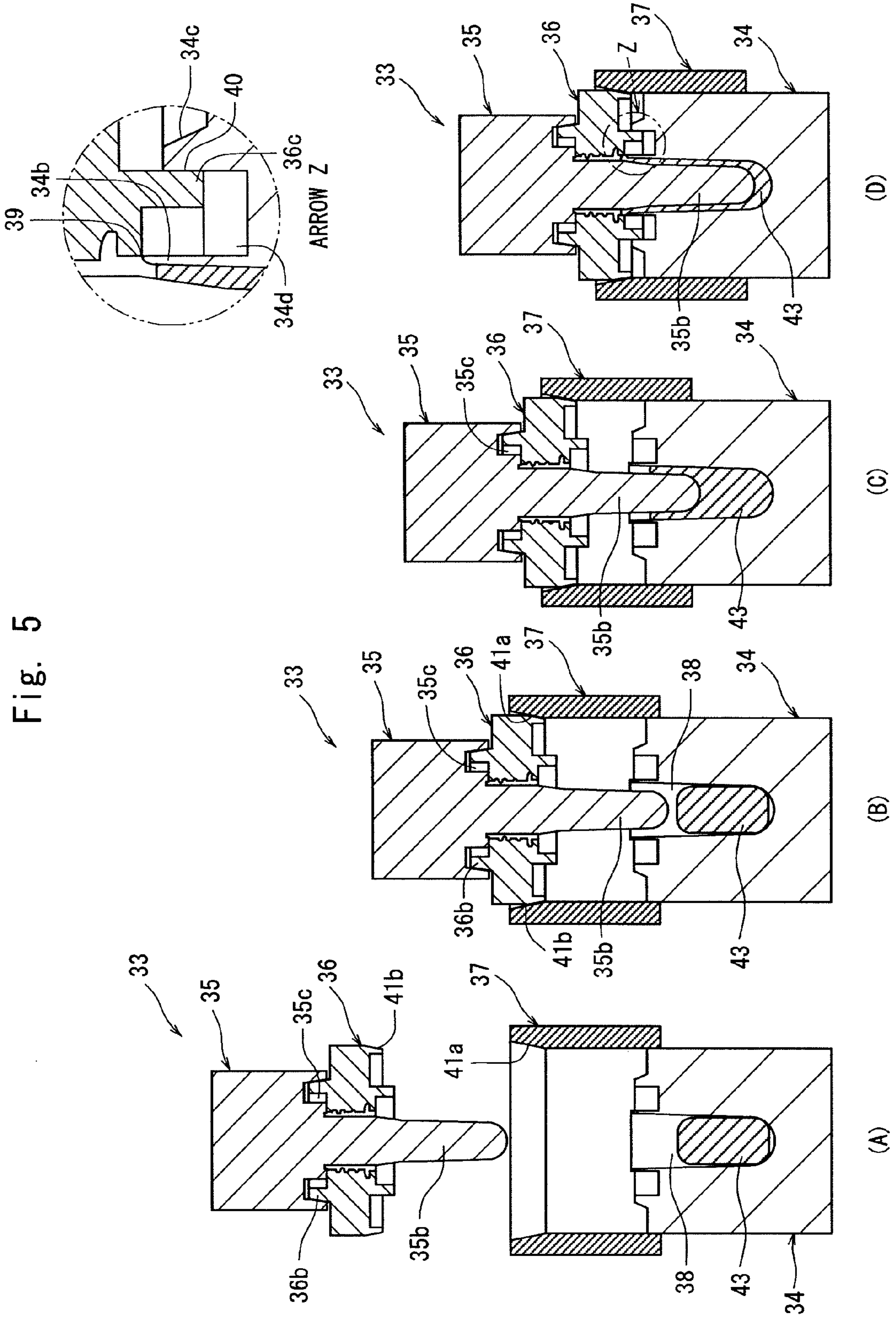
FIG. 5 is a view of steps illustrating the procedure of operation of the metal mold for compression-forming the preform, wherein A is a sectional view of the fourth step, B is a sectional view of the fifth step, C is a sectional view of the sixth step and D is a sectional view of the seventh step.

As the core metal mold 35 further descends as shown in FIG. 5B, the end of the core body 35*b* enters into the cavity 38, and the slide insert metal mold 36 comes in contact with the guide ring 37. That is, the outer circular truncated conical surface 41*b* of the outer convex portion 36*d* on the lower and outer circumferential portion of the slide insert metal mold 36 temporarily comes into contact with the inner circular truncated conical surface 41*a* on the upper inner circumferential surface of the guide ring 37. These surfaces fit and slide each other, and, though roughly, the guide ring 37 and the slide insert metal mold 36 come in contact in a state of being centered. Therefore, the annular protruded portion 36*b* at the upper part of the slide insert metal mold 36 comes into fit and contact with the annular concave portion 35*c* to form the fitting portion 42. The outer convex portion 36*d* at the lower part of the slide insert metal mold 36 comes into fit and contact with the guide ring 37, and is limited from opening outward.

Referring to FIG. 5C, as the core metal mold 35 further descends, the core body 35*b* starts compressing the molten resin 43. As the core metal 35 descends further, the slide insert metal mold 36 comes in contact with the cavity metal mold 34.

An arrow Z in FIG. 5D shows a moment when the outer auxiliary fitting portion 40 is fitted and the inner fitting portion 39 is contacted. Thus, of the fitting portion 39 and the auxiliary fitting portion 40 of the slide insert metal mold 36, the auxiliary fitting portion 40 on the outer side comes into contact and fit, first. Next, the fitting portion 39 comes into contact and fit. That is, the inner convex portion 36*c* of the slide insert metal mold 36 comes into contact and fit with the protruded portion 34*c* of the cavity metal mold 34 and after the auxiliary slide portions 40*a* and 40*b* start sliding, the slide surface 39*b* of the slide insert metal mold 36 slides on the slide surface 39*a* of the small protuberance 34*b* of the cavity metal mold 34.

In this embodiment, further, the fitting clearance in the fitting portion of the auxiliary fitting portion 40 is formed to be smaller than the fitting clearance of the fitting portion 39. Upon setting the clearance of the slidable auxiliary fitting portion 40 to be narrower than that of the fitting portion 39 that includes the preforming-forming portion as described above, the load to the fitting portion 39 at the time of sliding can be decreased. Upon attaining the positioning, first, by the auxiliary fitting portion 40 that slides auxiliary, deviation of the metal molds can be eliminated, and the fitting portion 39 can be widened in a range in which the resin does not leak.

According to this embodiment as described above, the slidable auxiliary fitting portion 40 is provided at a portion that does not include the preform-forming portion making it possible to decrease the load to the fitting portion 39 that includes the preform-forming portion. The auxiliary fitting portion 40 bears a large load and should, desirably, be made of a material having excellent wear resistance. For example, the slide insert metal mold 36 as a whole and/or the cavity metal mold 34 as a whole are desirably made of a hard material. The inner convex portion 36*c* of the slide insert metal mold 36 may be such that a portion including at least the auxiliary slide surface 40*b* of the inner convex portion 36*c* and/or the portion including at least the auxiliary slide surface 40*a* of the annular dented portion 34*d* may, preferably, be made of a hard material, or that the portion including at least the auxiliary slide surface 40*b* of the inner convex portion 36*c* and/or the portion including at least the auxiliary slide surface 40*a* of the annular dented portion 34*d* may be the inserts which are replaceable.

Further, the fitting portion provided at a position near the preform-forming portion helps improve the positioning (centering) precision and uniformalize the thickness of the body portion of the preform.

The guide ring 37 and the outer convex portion 36*d* of the slide insert metal mold 36 that slide and come in contact (fit), serve as an insertion guide portion in advance of the auxiliary fitting portion 40.

As the fitting and sliding motion of the auxiliary fitting portion 40 ends, the fitting and sliding motion of the fitting portion 39 ends and the core metal mold 35 descends to the lowermost end position as shown in FIG. 3, a gap is defined for forming the molten resin 43 into the shape of the preform by the cavity metal mold 34, core metal mold 35 and slide insert metal mold 36, and the gap is filled with the molten resin 43.

Figure 6:
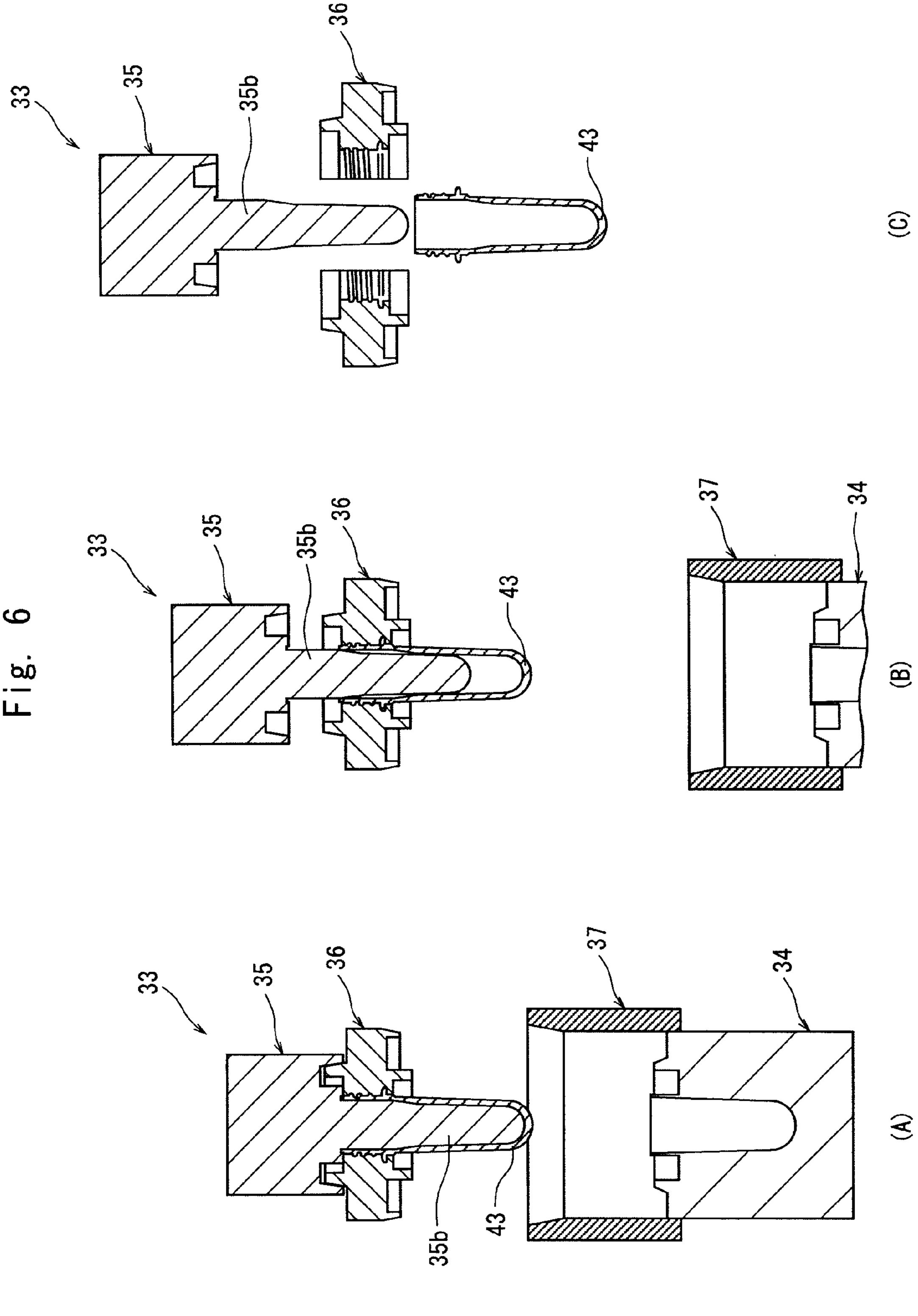
FIG. 6 is a view of steps illustrating the procedure of operation of the metal mold for compression-forming the preform, wherein A is a sectional view of the eighth step, B is a sectional view of the ninth step and C is a sectional view of the tenth step.
Figure 7:
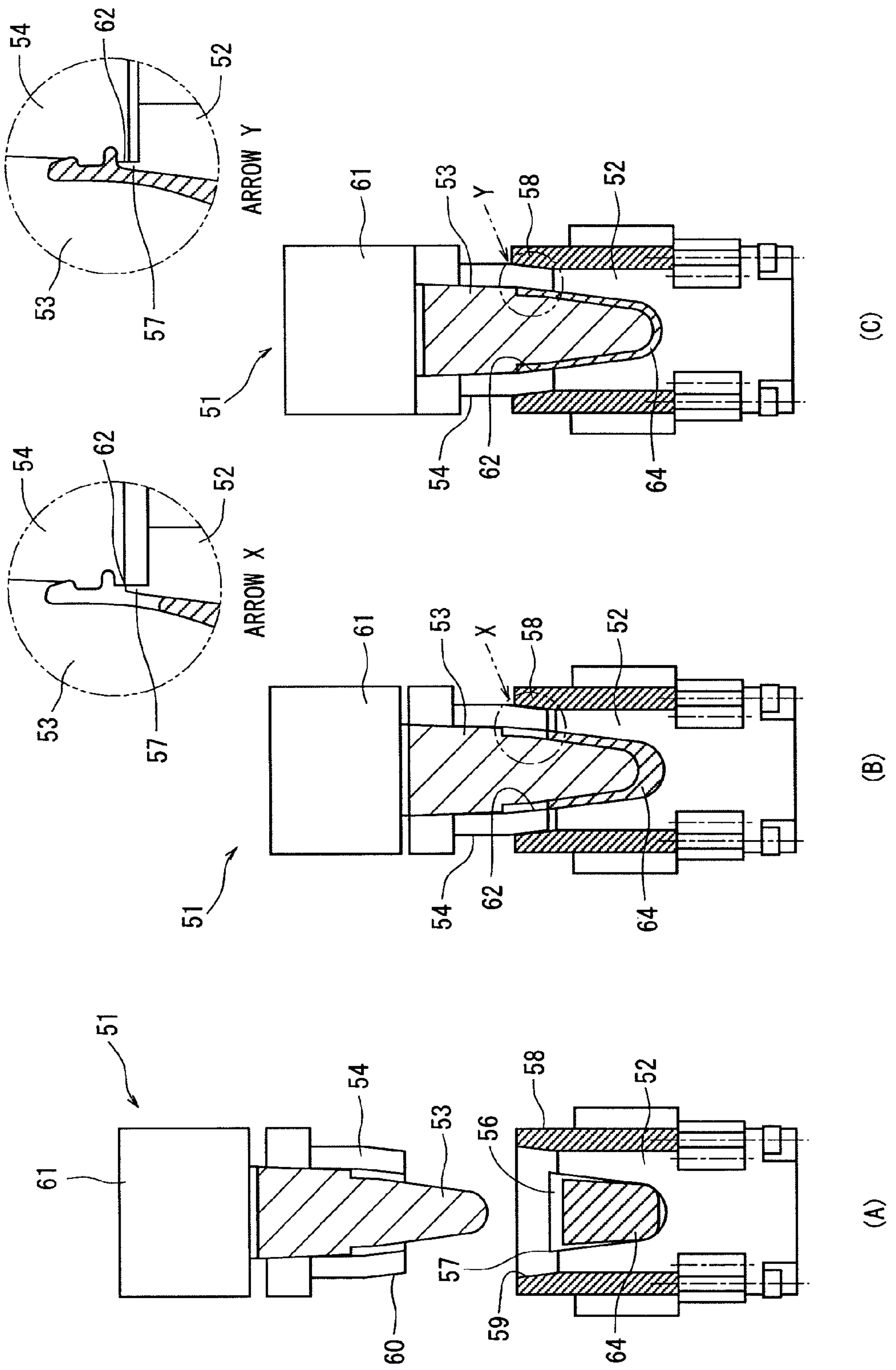
FIG. 7 illustrates a conventional metal mold for compression-forming a preform wherein A is a sectional view of the initial step for forming the preform by using the metal mold for compression forming, B is a sectional view of the intermediate step and C is a sectional view of when clamping the metal mold.

Referring to FIG. 6A, as the molten resin 43 is cooled down to a temperature for taking out from the forming meta mold, the metal mold 33 for forming the preform is opened, and both the core metal mold 35 and the slide insert metal mold 36 ascend. The preform (hereinafter, the molten resin after formed is referred to as preform) 43 has its nozzle-forming portion held by the core metal mold 35, and ascends together with the core body 35*b*. At this moment, the cavity metal mold 34 is parted from the slide insert metal mold 36, and the fitting portion 39 undergoes the sliding motion for parting. At the time of parting, too, the fitting clearance of the fitting portion 39 is maintained large, and the fitting portion 39 slides with a decreased burden.

Referring next to FIG. 6B, the core metal mold 35 and the slide insert metal mold 36 are parted from each other, and the preform 43 is pulled out from the core body 36*b*. Referring to FIG. 6C, the slide insert metal mold 36 is opened to the right and left, and the preform 43 is removed from the slide insert metal mold.

Reverting to FIG. 1, a mechanism 38 for taking out the preform from the cavity metal mold 34 is arranged on the downstream of the apparatus 31 for compression forming in the direction of rotation, and the preform is conveyed to the blow-forming step and the like step on the downstream side.

Though the invention was described above by way of an embodiment, it should be noted that the invention can be varied or modified in a variety of ways without departing from the technical scope of the invention, as a matter of course.

The above embodiment has dealt with the metal mold 33 for compression-forming the preform. However, the invention can also be applied to an ordinary resin-forming metal mold without blow forming.

It is, further, desired that the auxiliary fitting portion 40 is contacted and slid earlier than the fitting portion 39. However, the auxiliary fitting portion 40 and the fitting portion 39 may be contacted and slid simultaneously. It is, further, desired that the fitting clearance of the auxiliary fitting portion 40 is smaller than that of the fitting portion 39. However, the two may have the same fitting clearance.

The invention claimed is:

1. A metal mold for compression forming, comprising:

a cavity metal mold for forming the outer surface of a blow-formed portion of a preform which is a formed body;

a core metal mold for forming at least the inner surface of said preform; and a slide insert metal mold split into at least two and structured and arranged for upward and downward movement, and for forming the outer surface of at least a nozzle portion of said preform;

wherein said slide insert metal mold coupled together from a split state is lowered onto said cavity metal mold thereby sliding a fitting portion which includes a preform-forming portion of said slide insert metal mold and said cavity metal mold to maintain a pressure; and an auxiliary fitting portion where said slide insert metal mold and said cavity metal mold undergo sliding is structured and arranged at a position not forming the preform and separate from the fitting portion that includes said preform-forming portion, wherein the auxiliary fitting portion comprises a cylindrically shaped surface, wherein at the time of closing operation of the cavity metal mold and the core metal mold during compression forming, after said auxiliary fitting portion starts to come into contact with and slides earlier than the fitting portion which includes said formed body-forming portion, said formed body forming portion fits and slides, and wherein the fitting clearance of said auxiliary fitting portion is smaller than that of the fitting portion which includes said formed body-forming portion.

2. The metal mold for compression forming according to claim 1, further including a slidable guide ring for guiding and clamping split surfaces on the outer circumferential surface of said cavity metal mold; wherein an inner circular truncated conical surface is formed in the inner circumferential surface of said guide ring, an outer circular truncated conical surface is formed in the outer circumferential surface of said slide insert metal mold, said guide ring clamps and fixes the split surfaces as the inner and outer circular truncated conical surfaces come in contact with each other, and the inner and outer circular truncated conical surfaces come in contact with each other earlier than said auxiliary fitting portion that comes into fit.

3. The metal mold for compression forming according to claim 1, wherein the pressure is a holding pressure.

* * * * *